(12) United States Patent
Niu et al.

(10) Patent No.: US 8,774,868 B2
(45) Date of Patent: Jul. 8, 2014

(54) POWER-SAVING SYSTEM AND METHOD FOR A MOBILE TERMINAL

(75) Inventors: Chao Niu, Shenzhen (CN); Yaheng Wang, Shenzhen (CN); Wen Cong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,679

(22) PCT Filed: Oct. 15, 2010

(86) PCT No.: PCT/CN2010/077798
§ 371 (c)(1),
(2), (4) Date: Oct. 11, 2012

(87) PCT Pub. No.: WO2012/000250
PCT Pub. Date: Jan. 5, 2012

(65) Prior Publication Data
US 2013/0130745 A1    May 23, 2013

(30) Foreign Application Priority Data

Jun. 30, 2010    (CN) .......................... 2010 1 0219912

(51) Int. Cl.
*H04M 1/22*    (2006.01)
*H04W 52/02*    (2009.01)

(52) U.S. Cl.
USPC ........................... 455/566; 455/574; 345/589

(58) Field of Classification Search
None
See application file for complete search history.

(56) References Cited

U.S. PATENT DOCUMENTS

| 2004/0212840 | A1  | 10/2004 | Tanimoto |
|---|---|---|---|
| 2007/0040820 | A1  | 2/2007  | Lee |
| 2009/0066632 | A1* | 3/2009  | Chen ............................. 345/102 |
| 2009/0239591 | A1  | 9/2009  | Alameh et al. |
| 2009/0312059 | A1  | 12/2009 | Pratt et al. |
| 2011/0080422 | A1* | 4/2011  | Lee et al. ...................... 345/589 |
| 2012/0315963 | A1  | 12/2012 | Pratt et al. |

FOREIGN PATENT DOCUMENTS

| CN | 1540970    | 10/2004 |
|---|---|---|
| CN | 1822609    | 8/2006  |
| CN | 101296439  | 10/2008 |
| CN | 101710924 A | 5/2010 |
| EP | 1758357 A2 | 2/2007  |
| GB | 2345410 A  | 7/2000  |

OTHER PUBLICATIONS

International Search Report for International Patent Application No. PCT/CN2010/077798, completed Mar. 21, 2011, mailed Mar. 31, 2011 (3 pages).
Written Opinion of the International Searching Authority for International Patent Application No. PCT/CN2010/077798, completed Mar. 21, 2011, mailed Mar. 31, 2011 (3 pages).
International Preliminary Report on Patentability for International Application No. PCT/CN2010/077798, issued Jan. 8, 2013 (4 pages).
Supplementary European Search Report for European Patent Application No. EP 10853953.7, mailed Oct. 9, 2013 (6 pages).

* cited by examiner

*Primary Examiner* — Erika A Washington
(74) *Attorney, Agent, or Firm* — Clark & Elbing LLP

(57) ABSTRACT

The present invention discloses a power-saving system and method for a mobile terminal. By way of monitoring the power level of the mobile terminal, the present invention adopts a high visual contrast power-saving mode while reducing the backlight lightness when the power level is low. The present invention achieves the object of increasing the display resolution and facilitating the user to obtain information while saving power.

16 Claims, 6 Drawing Sheets

Monitor the remaining power level of a mobile terminal, and send a low-power state message when the remaining power level is lower than a first predefined power reference value — S102

After receiving the low power state message, automatically switch the current mode of the mobile terminal to a predefined high visual contrast power-saving mode and adjust the current lightness of the liquid crystal display of the mobile terminal to a predefined power-saving lightness — S104

POWER-SAVING SYSTEM AND METHOD FOR A MOBILE TERMINAL

CROSS-REFERENCE TO RELATED APPLICATIONS

This application is the U.S. National Stage filing under 35 U.S.C. §371 of International Application No. PCT/CN2010/077798, filed Oct. 15, 2010, which claims the benefit of Chinese Patent Application No. 201010219912.X, filed Jun. 30, 2010.

FIELD OF THE INVENTION

The present invention relates to the communication field and in particular to a power-saving system and method for a mobile terminal.

BACKGROUND OF THE INVENTION

Mobile terminals have become necessaries in our daily life due to its features such as diversified functions, being simple to operate, being easy to carry, etc.

At present, the biggest problem influencing the use of mobile terminals is the stand-by time of mobile terminals. A fashionable and powerful mobile terminal with exquisite workmanship may let people hang back merely due to its short standby time, and the stand-by time has become an important index for people to judge a mobile terminal, which problem is especially prominent in large-sized mobile terminals with color screen.

The power consumption of the liquid crystal display accounts for a big part of the power consumption of a mobile terminal. Generally, a method for saving the power of the liquid crystal display is merely to adjust the backlight lightness of the liquid crystal display. In the prior art, the patent application with publication number CN101378563 discloses a technical solution as follows: a camera is used to sense light and then the backlight lightness of liquid crystal display is adjusted according to the strength of the external light, thus achieving the effect of saving power.

In the prior art, the liquid crystal display can be grouped into two types of Normally White (NW) and Normally Black (NW), the former means that the panel we see is a pure white (255,255,255) graph when we do not apply voltage to the liquid crystal panel; and the latter, in contrast, will display an opaque pure black (0,0,0) graph. Since the common style used in our daily life is in the form of black words on white background and it saves more power to use NW-type panel, at present, the NW-type liquid crystal display is widely used and mobile terminals generally use NW-type liquid crystal display.

During the implementation of the present invention, the inventors recognize that the prior art has the following drawbacks: saving power only by way of adjusting the backlight lightness of the liquid crystal display causes that the display resolution of the mobile terminal is reduced and the difficulty of the user to obtain information is increased.

SUMMARY OF THE INVENTION

The object of the present invention is to provide a power-saving system and method for a mobile terminal so as to solve the problem with the conventional approach of conserving power by only adjusting the backlight lightness of the liquid crystal display, which could adversely affect the display resolution of the mobile terminal and make it more difficult for a user to obtain information from the mobile terminal.

A power-saving system for a mobile terminal is provided according to one aspect of the present invention, which system comprises: a power supply management module for monitoring a power level of said mobile terminal, and for sending a low power level state message when said power level is lower than a first predefined power level reference value; and a control module for, after receiving said low power level state message, changing a current mode of said mobile terminal to a predefined high visual contrast power-saving mode, and adjusting a current lightness of a liquid crystal display backlight of said mobile terminal to a predefined power-saving lightness.

Preferably, in this technical solution, the power-saving system for a mobile terminal further comprises: a memory module for, after receiving said low power level state message, switching to the power-saving mode, and for, before the current lightness of the liquid crystal display backlight of said mobile terminal is adjusted to a predefined power-saving lightness, storing the current mode and the current lightness of said mobile terminal; said power supply management module is configured for sending a low power level state termination message when the power level of said mobile terminal is higher than a second predefined power level reference value; and said control module is configured for replacing the power-saving mode of said mobile terminal with said stored current mode and adjusting the power-saving lightness of the liquid crystal display backlight of said mobile terminal with said stored current lightness after receiving said low power level state termination message.

Preferably, in this technical solution, the control module comprises: a Normally White (NW) sub-module for causing said mobile terminal to adopt a high visual contrast power-saving mode if said mobile terminal has a NW-type display screen and what is displayed on the screen meets the following conditions: a background picture is a pure white bitmap; a control icon has a predefined dark-color contour line; and text is in a font size smaller than a predefined size and has a predefined dark color; or a Normally Black (NB) sub-module for causing said mobile terminal to adopt a high visual contrast power-saving mode if said mobile terminal uses a NB-type display screen and what is displayed on the screen meets the following conditions: a background picture is a pure black bitmap; a control icon has a predefined light-color contour line; and text is in a font size smaller than a predefined size and has a predefined light color.

A power-saving method for a mobile terminal is provided according to another aspect of the present invention, which method comprises: monitoring a power level of said mobile terminal, and sending a low power level state message, when said power level is lower than a first predefined power level reference value; and after receiving said low power level state message, changing a current mode of said mobile terminal to a predefined high visual contrast power-saving mode and adjusting a current lightness of a liquid crystal display backlight of said mobile terminal to a predefined power-saving lightness.

By way of monitoring the power level of the mobile terminal by a power supply management module built in the mobile terminal, the present invention adopts a high visual contrast power-saving mode while reducing the backlight lightness when the power level is low. By way of the above technical means, it solves the problem with the conventional approach of conserving power by only adjusting the backlight lightness of the liquid crystal display, which could adversely affect the display resolution of the mobile terminal and make it more difficult for a user to obtain information from the mobile terminal, thus achieving the object of improving display resolution and facilitating the user to obtain information while saving power.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF THE EMBODIMENTS

The present invention is described in detail with reference to the accompanying drawings in combination with the embodiments hereinafter.

It should be explained that the embodiments of the present invention and the features of the embodiments can be combined with each other if there is no conflict.

System Embodiment I

Figure 1:
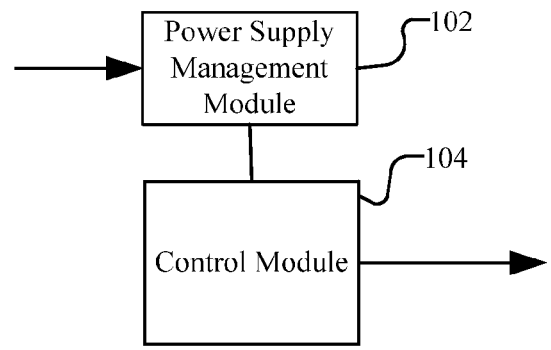
FIG. 1 is a schematic diagram of a power-saving system for a mobile terminal according to system embodiment I of the present invention.

FIG. 1 is a schematic diagram of a power-saving system for a mobile terminal according to system embodiment I of the present invention. As shown in FIG. 1, this embodiment discloses a power-saving system for a mobile terminal, which comprises: a power supply management module 102 for monitoring the power level of the mobile terminal, and, when the power level is lower than a first predefined power level reference value, sending a low power level state message; a control module 104 being connected to the power supply management module 102 for, after receiving the low power level state message, switching the current mode of the mobile terminal to a predefined high visual contrast power-saving mode and adjusting the current lightness of the liquid crystal display backlight of the mobile terminal to a predefined power-saving lightness.

In this embodiment, the first predefined power level reference value can use a default low power level alarm value of the mobile terminal and also can be set by the user himself, thus achieving user personalized setting of the mobile terminal. The predefined power-saving mode can be set by the user himself and can also be consolidated internally by the mobile terminal, the common feature of which is having a high visual contrast.

By way of adjusting the liquid crystal display backlight lightness and optimizing the display contents of the liquid crystal display, this embodiment reduces the power consumption of the liquid crystal display backlight, increases the visual contrast of the mode of the mobile terminal, and reduces the power consumption of the liquid crystal baseboard, which can save about 20% power for the mobile terminal. Due to the increase of visual contrast, the display resolution is increased, the problem that the user has difficulty in obtaining information which is caused by only adjusting the liquid crystal display backlight is avoided without increasing the difficulty of the user to obtain information.

System Embodiment II

This embodiment will further describe the power-saving system for a mobile terminal on the basis of embodiment I. The power-saving system for a mobile terminal of this embodiment can further comprise: a memorizing module being connected to the power supply management module and the control module for, after receiving a low power level state message, switching to a predefined power-saving mode, and before adjusting to a predefined power-saving lightness, memorizing the current mode and the current lightness of the mobile terminal.

In this embodiment, the power supply management module is further used for, when the power level of the mobile terminal is higher than a second predefined power level reference value, sending a low power level state termination message; and the control module is further used for, after receiving the low power level state message, automatically switching the power-saving mode of the mobile terminal to the current stored mode and adjusting the power-saving lightness of the liquid crystal display backlight of the mobile terminal to the current stored lightness.

In this embodiment, the second predefined power level reference value is preferably bigger than the first predefined power level reference value in embodiment I, thus achieving a delay effect. Certainly for the sake of simplicity and convenience, the first predefined power level reference value can also be set to be equal to the second predefined power level reference value.

By storing the settings before the switch when carrying out power saving switch and recovering to the original settings before the switch automatically when the low power level state is removed, this embodiment achieves the intelligence of power-saving mode switch, which makes it more convenient for user use.

System Embodiment III

Figure 2:
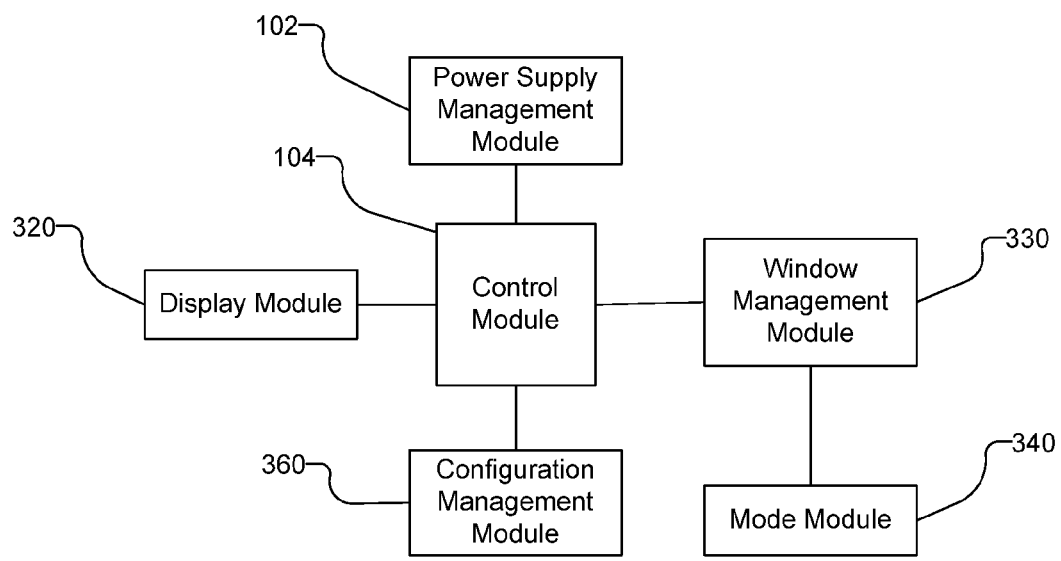
FIG. 2 is a schematic diagram of a power-saving system for a mobile terminal according to system embodiment III of the present invention.

This embodiment will further describe the power-saving system for a mobile terminal on the basis of embodiments I to II. FIG. 2 is a schematic diagram of a power-saving system for a mobile terminal according to system embodiment III of the present invention. As shown in FIG. 2, this embodiment comprises: a power supply management module 102, a control module 104, a display module 320, a window management module 330, a mode manager 340, and a configuration management module 360.

The power supply management module 102 refers to a module which is responsible for battery management, power supply switch and power distribution.

The control module 310 is consisted of a micro-processor unit (MPU), which module controls the entire operation of the mobile terminal and various functions in the mobile terminal are achieved by it, such as calling, receiving/sending short messages, input method, storing phone numbers, call history, handling user input (user keystroke operation) and so on. In the embodiments of the present invention, it specially controls the graph contents to be shown on the display screen of the mobile terminal.

The display module 320 refers to a liquid crystal display (LCD) or similar devices. It displays the numbers, texts, lines, graphs and animations which are generated during the operation of the mobile terminal and transferred by the control module 104.

The window management module 330 is a manager of all the windows in the mobile terminal, which module is a software module. When the mobile terminal needs to display a new interface, it will be responsible for creating a window and then immediately obtaining the information about the background picture, font, size, color and the like of each control in the windows from the modes, and then the window management module 330 will plot a window according to such information, and the control module 310 enables the display module 320 to display it.

The mode management module 340 refers to a manager which is responsible for managing the display style of the mobile terminal interface in the mobile terminal. The so-called mode refers to a method for combining the font, size and color of the text and picture, dimension, and hue, and each combining method is a mode.

The configuration management module 360 refers to a portion which is responsible for reading and storing some important parameters of the mobile terminal.

Figure 3:
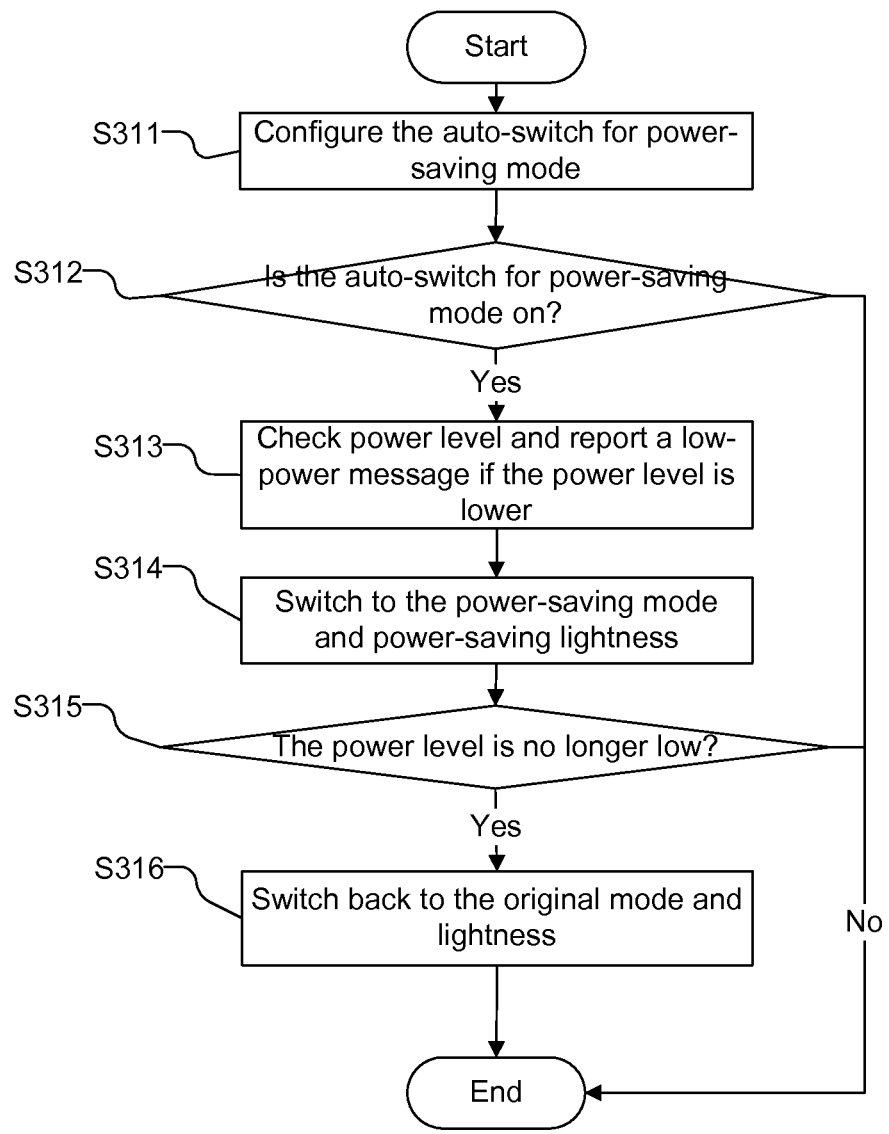
FIG. 3 is a flow chart of a power-saving system for a mobile terminal achieving low power level power saving according to system embodiment III of the present invention.

The functions achieved by each portion will be described in detail in the following in conjunction with the implementation procedure of this technical solution. FIG. 3 is a flow chart of a power-saving system for a mobile terminal to achieve low power level power saving according to embodiment III of the present invention. As shown in FIG. 3, this embodiment comprises:

Step S311: The control module 104 controls the configuration management module 360 to set the switch state of an auto-switch power-saving mode, which state includes two states of ON and OFF.

Step S312: The control module 104 checks the state of the auto-switch power-saving mode switch.

Step S313: The power supply management module 102 checks the power level of the mobile terminal, if it finds that the power level is low, then the power supply management module learns that the state of the auto-switch power-saving mode switch is ON and sends a low power level state message to the control module 310.

Step S314: After receiving the message, the control module 104 immediately performs mode switch. The particular switch process is as follows. The control module 104 controls the window management module 330 to re-plot the interface, and during this process, the window management module 330 obtains the information such as the background picture, text settings and the like of each control in the interface from the mode module 340; and after the interface has been plotted by the window management module 330, the control module 104 controls the display module 320 to display it. At the same time, it adjusts the backlight lightness of the display module 320 to a power-saving lightness.

Step S315: The power supply management module 102 checks the power level of the mobile terminal, if it finds that the low power level state has been removed, the power supply management module learns that the state of the auto-switch power-saving mode switch is ON and sends a low power level state termination message to the control module 104.

Step S316: After receiving the message, the control module 104 immediately controls the configuration management module 360 to recover the mode, the specific process of recovering the original mode of which is the same as the process in S314. At the same time, it adjusts the backlight lightness of the display module 320 to the original lightness.

This embodiment details the functions achieved by each module in embodiment I and embodiment II and have all beneficial effects of the above embodiments, which will not be described here redundantly.

System Embodiment IV

This embodiment will describe the power-saving modes in the system embodiments I to III in detail.

As to a NW-type liquid crystal display, the control module comprises: a Normally White (NW) sub-module for adopting a high visual contrast power-saving mode which meets the following conditions: 1) the background picture provided for all controls is a pure white bitmap and the background picture preferably is in RGB (255,255,255) format; 2) the main graphs of all controls are of a skeletal structure sketched with black (not excluding other dark color) lines; and 3) all texts use the smallest font predefined in the mobile terminal and are in black (not excluding other dark colors).

As to a NB-type liquid crystal display, the control module comprises: a Normally Black (NB) sub-module for adopting a high visual contrast power-saving mode which meets the following conditions: 1) the background picture provided for all controls is a pure black bitmap and the background picture preferably is in RGB (0,0,0) format; 2) the main graphs of all controls are of a skeletal structure sketched with white (not excluding other light colors) lines; and 3) all texts use the smallest font predefined in the mobile terminal and are in white (not excluding other light colors).

Figure 4:
FIG. 4 is a schematic diagram of a scrollbar in the prior art.
Figure 5:
FIG. 5 is a schematic diagram of a scrollbar for a NW-type liquid crystal display according to system embodiment VI of the present invention.

FIG. 4 is a schematic diagram of a scrollbar in the prior art, the slide slot and slide block of which are of solid structure. FIG. 5 is a schematic diagram of a scrollbar in a NW-type liquid crystal display screen according to system embodiment IV of the present invention. As shown in FIG. 5, this scrollbar is in a form of line skeleton and the slide slot is consisted of a graph with two similar blankets (which can also be points, straight lines or other graphs) at the top and the bottom. The structure of the slide block is the same as that of the slide slot, which differs in that there is a vertical line graph (which can also be a point, a straight line or other graphs) between the top graph and the bottom graph. This design is not limited by the direction of the scrollbar, and this also applies to a horizontal scrollbar. Such design can reduce the number of powered-up pixels of the liquid crystal baseboard to the greatest extent.

Figure 6:
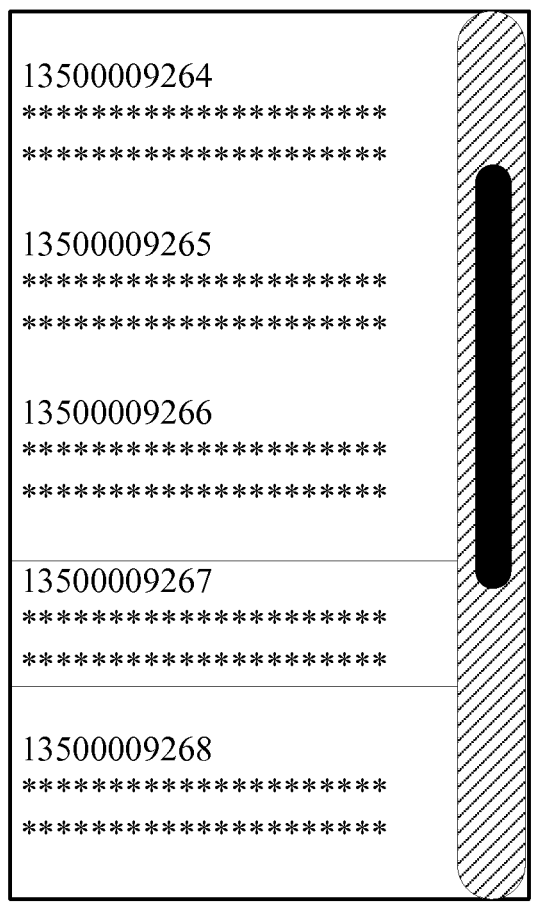
FIG. 6 is a schematic diagram of a traditional mode which is used in the prior art.
Figure 7:
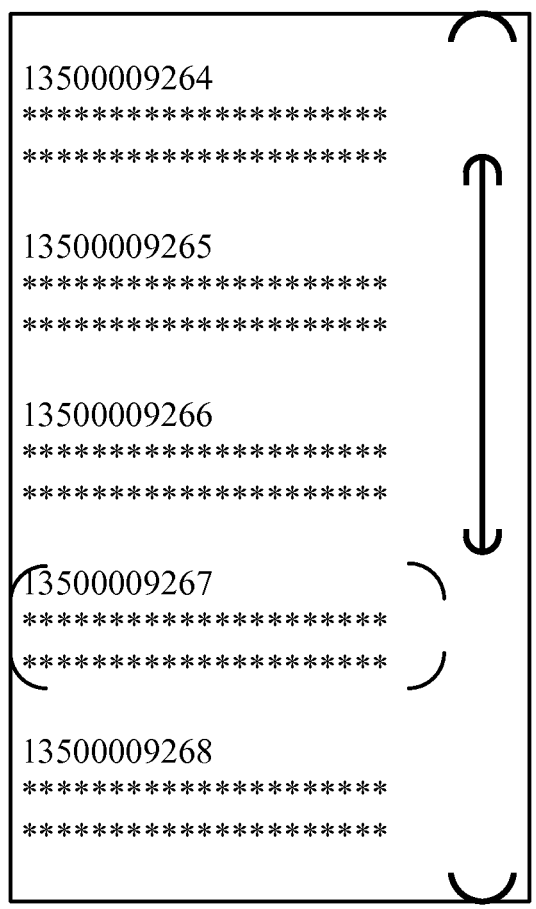
FIG. 7 is a schematic diagram of a power-saving mode for a NW-type liquid crystal display according to system embodiment VI of the present invention.

FIG. 6 is a schematic diagram of a traditional mode which is used in the prior art. FIG. 7 is a schematic diagram of a power-saving mode of a NW-type liquid crystal display according to system embodiment IV of the present invention. As shown in FIG. 7, the background uses a pure white picture in the mode; the main graphs of all controls are of a skeletal structure sketched with black (not excluding other dark colors) lines; and all texts use the smallest font predefined in the mobile terminal and are in black color (not excluding other dark colors).

As to a NB-type liquid crystal display, the outlook of its controls is the same as that of NW-type, just in opposite color.

In this embodiment, the above design is used to make the graphs simple and clear, and at the same time it reduces the number of powered-up pixels, thus achieving the object of saving power without reducing the display contrast.

Method Embodiment I

Figure 8:
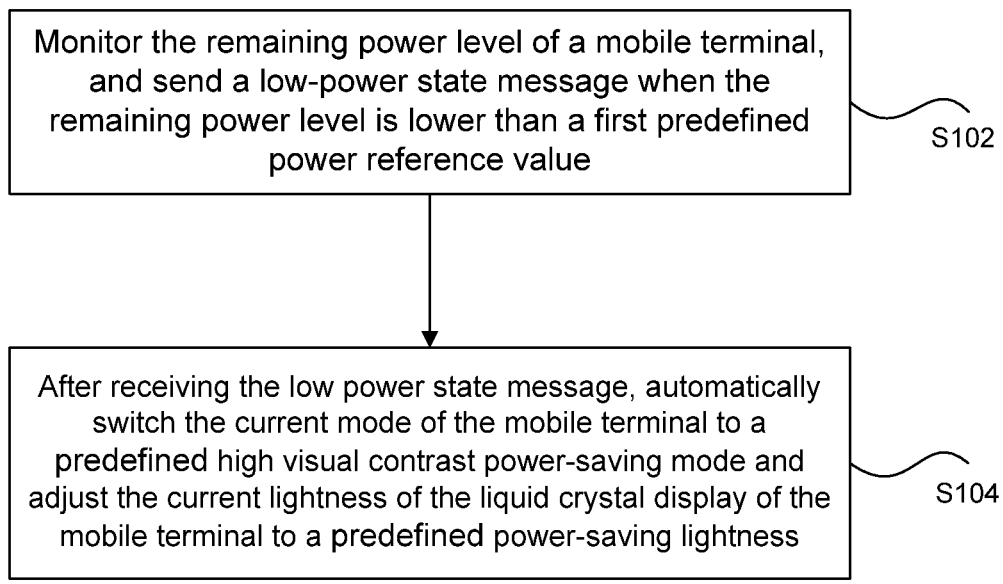
FIG. 8 is a flow chart of a power-saving method for a mobile terminal according to method embodiment I of the present invention.

FIG. 8 is a flow chart of a power-saving method for a mobile terminal according to method embodiment I of the present invention. As shown in FIG. 8, this embodiment comprises:

S102: Monitor the power level of a mobile terminal, and when the power level is lower than a first predefined power level reference value, send a low power level state message;

S104: After receiving the low power level state message, switch the current mode of the mobile terminal to a predefined high visual contrast power-saving mode automatically and adjust the current lightness of the liquid crystal display of the mobile terminal to a predefined power-saving lightness.

In this embodiment, before switching to the predefined power-saving mode and adjusting to the predefined power-saving lightness after receiving the low power level state message, it can further comprises: memorizing the current mode and the current lightness of the mobile terminal; and after switching to the predefined power-saving mode and adjusting to the predefined power-saving lightness, it correspondingly comprises: when the power level of the mobile terminal is higher than a second predefined power level reference value, sending a low power level state termination message; and after receiving the low power level state termination message, switching the power-saving mode of the mobile terminal to the stored current mode automatically, and adjusting the power-saving lightness of the liquid crystal display in the mobile terminal to the stored current lightness.

The apparatus implemented by this embodiment is an apparatus in embodiment I and embodiment II, and the power-saving mode is the node mode described in embodiment IV. This embodiment has all the beneficial effects of the above embodiments, which will not be described here redundantly.

Method Embodiment II

This embodiment details each implementation step on the basis of method embodiment I. The power-saving method for a mobile terminal of this embodiment in particular comprises:

Step 1: After starting up, check the configuration condition of a mobile terminal, and obtain a mobile terminal low power level auto-switch power-saving mode switch value switch_AutoChgToPowerSavMode;

Step 2: Determine the value of switch_AutoChgToPowerSavMode, if it is ON, then proceed to step 3, otherwise directly end the procedure;

Step 3: The power supply management module regularly checks the current power level state of the battery, obtain a power level reference value b_curr, compares the current power level reference value b_curr with a predefined low power level reference value b_low, if b_curr is less than or equal to b_low, then it is reported to the control module. In contrast, if b_curr is greater than b_low, then directly end the procedure.

Step 4: The control module receives a low power level alarm, immediately switches the mode to the power-saving mode of the present invention, and adjusts the liquid crystal display backlight lightness to a power-saving lightness l_powerSav. At the same time, the previous mode t_prev and the previous backlight lightness l_prev are recorded.

Step 5: When the power level recovers to be above b_low, the mobile terminal automatically switches back to t_prev and recovers the backlight lightness l_prev.

This embodiment does not need to perform hardware improvement but only makes changes to the built-in programs, thus making the liquid crystal display of the mobile terminal to save power to a larger extent, especially when the power level of the mobile terminal is low. The implementation method of this embodiment can be referred to the particular description of method embodiment I, and the implementation method is more particular and has all the beneficial effects of the above embodiments, which will not be described here redundantly.

Apparently, those skilled in the art should understand that the above modules and steps of the present invention can be achieved by using general purpose calculating device, can be integrated in one calculating device or distributed on a network which consists of a plurality of calculating devices; Alternatively, the modules and the steps of the present invention can be realized by using the executable program code of the calculating device, and thereby they can be stored in the storing device and executed by the calculating device, and in some cases, the steps shown or described can be carried out in a different order, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A power-saving system for a mobile terminal, comprising:
   a power supply management module for monitoring a power level of said mobile terminal, and for sending a low power level state message when said power level is lower than a first predefined power level reference value; and
   a control module for, after receiving said low power level state message, changing a current mode of said mobile terminal to a predefined high visual contrast power-saving mode, and adjusting a current lightness of a liquid crystal display backlight of said mobile terminal to a predefined power-saving lightness.

2. The system according to claim 1, further comprising:
   a memory module for, after receiving said low power level state message, switching to the power-saving mode, and for, before the current lightness of the liquid crystal display backlight of said mobile terminal is adjusted to a predefined power-saving lightness, storing the current mode and the current lightness of said mobile terminal;
   wherein:
   said power supply management module is configured for sending a low power level state termination message when the power level of said mobile terminal is higher than a second predefined power level reference value; and
   said control module is configured for replacing the power-saving mode of said mobile terminal with said stored current mode and adjusting the power-saving lightness of the liquid crystal display backlight of said mobile terminal with said stored current lightness after receiving said low power level state termination message.

3. The system according to claim 2, further comprising:
a configuration module coupled to said control module for storing configuration information for configuring the mobile terminal to switch to the predefined power-saving mode and adjust to the predefined power-saving lightness; and
wherein said control module is configured for obtaining said configuration information from said configuring module and performing said mode switch and backlight adjustment according to said configuration information after receiving said low power level state message.

4. The system according to claim 1, wherein said control module further includes:
a Normally White (NW) sub-module for causing said mobile terminal to adopt a high visual contrast power-saving mode if said mobile terminal has a NW-type display screen and what is displayed on the screen meets the following conditions: a background picture is a pure white bitmap; a control icon has a predefined dark-color contour line; and text is in a font size smaller than a predefined size and has a predefined dark color; or
a Normally Black (NB) sub-module for causing said mobile terminal to adopt a high visual contrast power-saving mode if said mobile terminal uses a NB-type display screen and what is displayed on the screen meets the following conditions: a background picture is a pure black bitmap; a control icon has a predefined light-color contour line; and text is in a font size smaller than a predefined size and has a predefined light color.

5. The system according to claim 4, wherein said predefined dark color is black and said predefined light color is white.

6. The system according to claim 5, further comprising:
a configuration module coupled to said control module for storing configuration information for configuring the mobile terminal to switch to the predefined power-saving mode and adjust to the predefined power-saving lightness; and
wherein said control module is configured for obtaining said configuration information from said configuring module and performing said mode switch and backlight adjustment according to said configuration information after receiving said low power level state message.

7. The system according to claim 4, further comprising:
a configuration module coupled to said control module for storing configuration information for configuring the mobile terminal to switch to the predefined power-saving mode and adjust to the predefined power-saving lightness; and
wherein said control module is configured for obtaining said configuration information from said configuring module and performing said mode switch and backlight adjustment according to said configuration information after receiving said low power level state message.

8. The system according to claim 1, further comprising:
a configuration module coupled to said control module for storing configuration information for configuring the mobile terminal to switch to the predefined power-saving mode and adjust to the predefined power-saving lightness; and
wherein said control module is configured for obtaining said configuration information from said configuring module and performing said mode switch and backlight adjustment according to said configuration information after receiving said low power level state message.

9. A method for saving power of a mobile terminal, comprising:
monitoring a power level of said mobile terminal, and sending a low power level state message, when said power level is lower than a first predefined power level reference value; and
after receiving said low power level state message, changing a current mode of said mobile terminal to a predefined high visual contrast power-saving mode and adjusting a current lightness of a liquid crystal display backlight of said mobile terminal to a predefined power-saving lightness.

10. The method according to claim 9, further comprising:
after receiving said low power level state message, switching to the predefined power-saving mode;
before the current lightness of the liquid crystal display backlight of said mobile terminal is adjusted to the predefined power-saving lightness, it further comprises, storing the current mode and the current lightness of said mobile terminal in a storage module; and
after switching the current mode of said mobile terminal to the predefined high visual contrast power-saving mode and adjusting the current lightness of the liquid crystal display backlight of said mobile terminal to the predefined power-saving lightness, sending a low power level termination message when the power level of said mobile terminal is higher than a second predefined power level reference value; and
after receiving said low power level state termination message, automatically switching the power-saving mode of said mobile terminal to said stored current mode and adjusting the power-saving lightness of the liquid crystal display of said mobile terminal to said stored current lightness.

11. The method according to claim 10, further comprising:
storing configuration information for configuring the mobile terminal to switch to the predefined power-saving mode and adjust to the predefined power-saving lightness; and
obtaining said configuration information from said configuring module and performing said mode switch and backlight adjustment according to said configuration information after receiving said low power level state message.

12. The method according to claim 9, further comprising:
if said mobile terminal has a Normally White (NW) type display screen, causing said mobile terminal to adopt said high visual contrast power-saving mode if what is displayed on the screen meets the following conditions: a background picture is a pure white bitmap; a control icon has a predefined dark-color contour line; and text is in a font size smaller than a predefined size and has a predefined dark color; or
if said mobile terminal has a Normally White (NB) type display screen, causing said mobile terminal to adopt said high visual contrast power-saving mode if what is displayed on the screen meets the following conditions: a background picture is a pure black bitmap; a control icon has a predefined light-color contour line; and text is in a font size smaller than a predefined size and has a predefined light color.

13. The method according to claim 12, wherein said predefined dark color is black and said predefined light color is white.

14. The method according to claim 13, further comprising:
storing configuration information for configuring the mobile terminal to switch to the predefined power-saving mode and adjust to the predefined power-saving lightness; and
obtaining said configuration information from said configuring module and performing said mode switch and backlight adjustment according to said configuration information after receiving said low power level state message.

15. The method according to claim 12, further comprising:
storing configuration information for configuring the mobile terminal to switch to the predefined power-saving mode and adjust to the predefined power-saving lightness; and
obtaining said configuration information from said configuring module and performing said mode switch and backlight adjustment according to said configuration information after receiving said low power level state message.

16. The method according to claim 9, further comprising:
storing configuration information for configuring the mobile terminal to switch to the predefined power-saving mode and adjust to the predefined power-saving lightness; and
obtaining said configuration information from said configuring module and performing said mode switch and backlight adjustment according to said configuration information after receiving said low power level state message.

* * * * *